United States Patent [19]

Lengsfeld

[11] 4,135,612

[45] Jan. 23, 1979

[54] ELECTRIC MOTOR WITH AIR COOLED CLUTCH AND BRAKE

[75] Inventor: Karl Lengsfeld, Plankstadt, Germany

[73] Assignee: Frankl & Kirchner GmbH & Co., KG, Schwetzingen, Germany

[21] Appl. No.: 738,966

[22] Filed: Nov. 4, 1976

[30] Foreign Application Priority Data

Nov. 5, 1975 [DE] Fed. Rep. of Germany ....... 2549545

[51] Int. Cl.² .............................................. F16D 67/06
[52] U.S. Cl. .............................. 192/18 B; 192/113 A; 192/84 AA; 192/110 B
[58] Field of Search ................... 192/18 B, 12 D, 48.2, 192/84 AA

[56] References Cited

U.S. PATENT DOCUMENTS

| | | | |
|---|---|---|---|
| 2,863,326 | 12/1958 | Maurice et al. | 192/84 AA X |
| 3,123,193 | 3/1964 | Marland | 192/18 B |
| 3,777,864 | 12/1973 | Marti | 192/18 B |
| 3,945,476 | 3/1976 | Jong | 192/18 B |

*Primary Examiner*—Benjamin W. Wyche
*Attorney, Agent, or Firm*—Browdy and Neimark

[57] ABSTRACT

An electric motor control and variable speed drive includes a motor housing, a driven rotor connected to a disk flywheel and an intermittently driven shaft, and nonrotatably supporting a clutch disk and a brake disk. The clutch disk is couplable with a frictional surface on a magnetic armature disk. The brake disk is couplable with a frictional surface of a brake armature disk. Energization of respective clutch and brake windings effect respectively coupling of the clutch disk and of the brake disk to the respective aforementioned frictional surfaces. The clutch winding is disposed on the disk flywheel. The clutch disk and the brake disk are provided with frictional linings. The clutch disk is disposed between the magnetic armature disk and a friction surface of the disk flywheel. The brake disk is disposed between the brake armature disk and a friction surface on the bearing plate.

8 Claims, 4 Drawing Figures

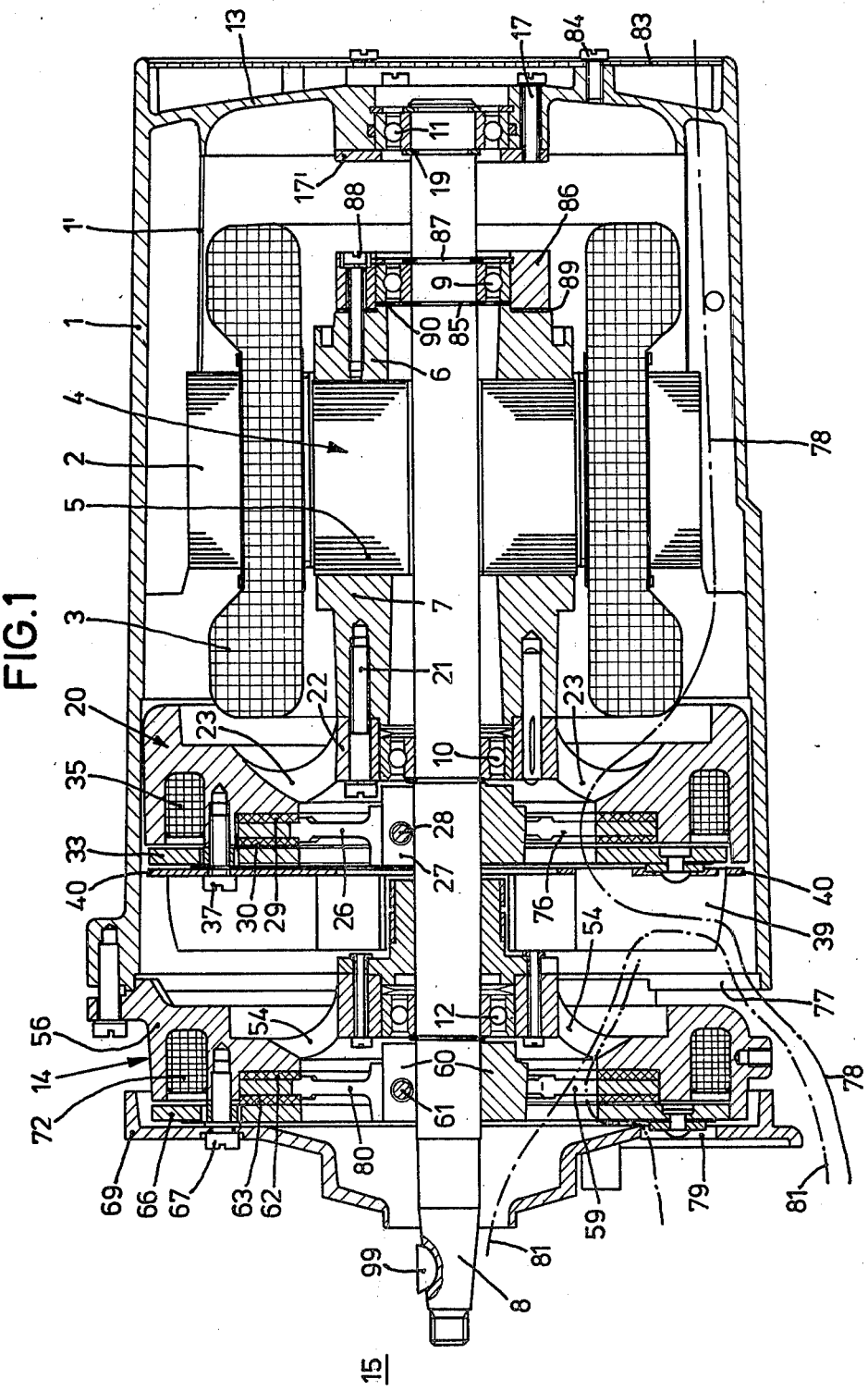

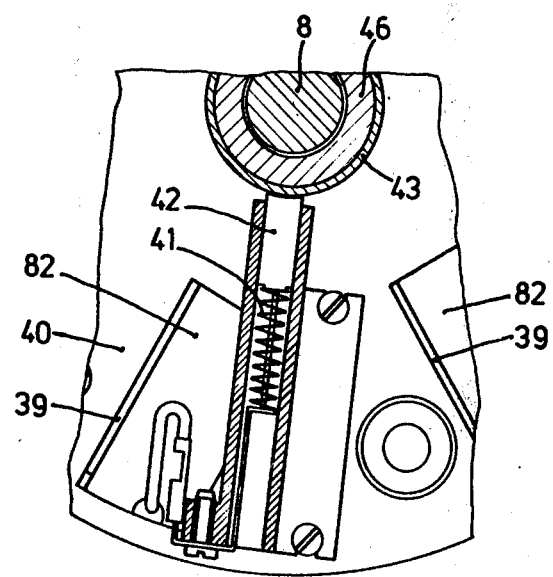

ELECTRIC MOTOR WITH AIR COOLED CLUTCH AND BRAKE

BACKGROUND OF THE INVENTION

This invention relates to an electric motor control and variable speed drive which includes a motor housing, a constantly driven rotor nonrotatably connected with a disk flywheel and an intermittently driven shaft on which a clutch disk and a brake disk are nonrotatably mounted. The present invention more particularly relates to such a drive in which the clutch disk can be coupled with one frictional surface of an axially displaceable magnetic armature disk, this disk being mounted on the disk flywheel, when a clutch winding is energized, and whereby the brake disk can be brought into mesh with one frictional surface of an axially displaceable brake armature disk mounted in the motor housing, when a brake winding disposed in a brake bearing plate is energized.

Similar known drives, for example the drive disclosed in the U.S. Pat. No. 3,750,781 to Lengsfeld issued Aug. 7, 1973 and entitled "Electric Motor with Built-In Electro-magnetic Disk Clutch and Brake" have the fundamental advantage that the inertia of the parts which are only intermittently driven, namely, when the clutch winding is energized, is relatively small, thereby achieving short acceleration and/or short braking periods. This is especially advantageous in cases where a relatively high switching frequency is utilized, as is the case for example when such drives are used as positioning drives for sewing machines in the sewing industry.

In the drive known from the afore-mentioned U.S. Pat. No. 3,750,781, the clutch winding is also disposed in a bearing plate. When the clutch winding is energized, the magnetic armature ring which is fastened to the disk flywheel and is axially spring loaded is drawn to the clutch magnet constituted by the clutch winding and the bearing plate, thus engaging the clutch lining on the clutch disk. The brake operates on a similar principle. Since the clutch winding and brake winding are disposed in the two bearing plates of the housing, the two bearing plates must be magnetically insulated from one another to prevent any undesirable mutual influences. As a result, and because of the nature of the design of the clutch and brake disks, i.e., because of the mechanical transmission of the force of friction, relatively high electrical power is required to excite the clutch winding and/or the brake windings.

In the drive known from German Offenlegungsschrift No. 2,105,959, the clutch disk and/or brake disk are themselves made of ferromagnetic material and are drawn against a brake lining disposed between the brake winding and the brake disk when the brake winding is energized and drawn against the disk flywheel disposed between the clutch winding and the clutch disk when the clutch winding is energized. As a result of the unfavorable magnetic flux, high electrical power levels are required, especially to excite the clutch winding.

SUMMARY OF THE INVENTION

It is the principal object of the present invention to provide a drive of the type described hereinabove in such fashion that the electrical power required to produce the required braking and/or clutch torque and the heating of the brake and clutch can be minimized as much as possible with simultaneous reduction of wear.

The above-mentioned object, as well as others which are to become apparent from the text below, are achieved according to the invention by virtue of the fact that the clutch winding is disposed in the disk flywheel and rotates with the latter, by the fact that the clutch disk and the brake disk are provided on both sides with frictional linings, by the fact that the clutch disk is disposed between the magnetic armature ring and a frictional surface on the disk flywheel, and by the fact that the brake disk is disposed between the brake armature ring and a frictional surface on the brake bearing plate. The arrangement of the clutch winding in the disk flywheel ensures a direct magnetic flux between the magnetic armature ring and the disk flywheel which forms the magnet housing of the clutch. The fact that the clutch winding is no longer nondisplaceably mounted in the motor housing ensures that mutual magnetic influences between the brake and clutch are practically ruled out. Since the magnetic armature ring rotates with the disk flywheel, and therefore has no velocity relative to the latter, the air gap between the disk flywheel and the magnetic armature ring can be made very small when the clutch coil is energized without any wear occurring. Even if the air gap is zero, there will be no damage to the magnetic armature ring or to the disk flywheel.

By these measures, the required electrical clutch or braking power is reduced. The fact that the clutch disk and brake disk are each provided on both sides with clutch or brake linings makes it possible to double the areas transmitting torque without increasing the space requirement. At the same time, the clutch and brake heating are reduced, since in each case two linings which are not in direct spatial communication are used. On the whole, therefore, cooling problems are reduced.

According to an advantageous embodiment of the invention, the disk flywheel is axially displaceably mounted with the rotor on the shaft and can be moved toward the clutch disk against a spring element operating between the shaft and the rotor. Therefore, when the clutch winding is excited, the magnetic armature ring is pressed against one clutch lining on the one hand and the displacement of the rotor and the disk flywheel causes the frictional surface on the disk flywheel to press against the other frictional lining.

In addition, it is advantageous if the brake disk with the shaft is axially displaceable toward the brake bearing plate against a spring element acting between the motor housing and the shaft.

In this manner, a uniform stress on the two brake linings is ensured in a theoretically similar fashion. The combination of these measures ensures that there is no mutual influence between the clutch and brake, since when the clutch winding is energized, only the rotor is axially displaced with the disk flywheel in one direction, while when the brake winding is energized the shaft with the brake disk and the clutch disk is moved in the other direction, but the rotor, disk flywheel and magnetic armature ring are carried along as well.

In a preferred embodiment, in which the disk flywheel and brake bearing plate are mounted side by side on one side of the rotor, and whereby a fanwheel is connected to the rotor, the fanwheel is disposed on the disk flywheel between the disk flywheel and the brake bearing plate. This ensures a particularly intensive cooling of the clutch and brake. It is particularly advantageous if holes for the air flow drawn in by the fanwheel are provided in the disk flywheel, the brake bearing plate, the clutch disk, and the brake disk. In this manner, air flows then flow through these four heat-generating components, flow radially past them, and can then be allowed to escape from the housing.

BRIEF DESCRIPTION OF THE DRAWINGS

Further advantages and features of the invention are to become apparent from the description of an embodiment with reference to the drawings, in which:

FIG. 1 is a vertical lengthwise section through a drive according to the present invention in association with an electric motor;

FIG. 3 is a section of a portion of the drive shown in FIG. 2, the section being taken along line III—III in FIG. 2.

DESCRIPTION OF THE PREFERRED EMBODIMENT

Figure 1A:
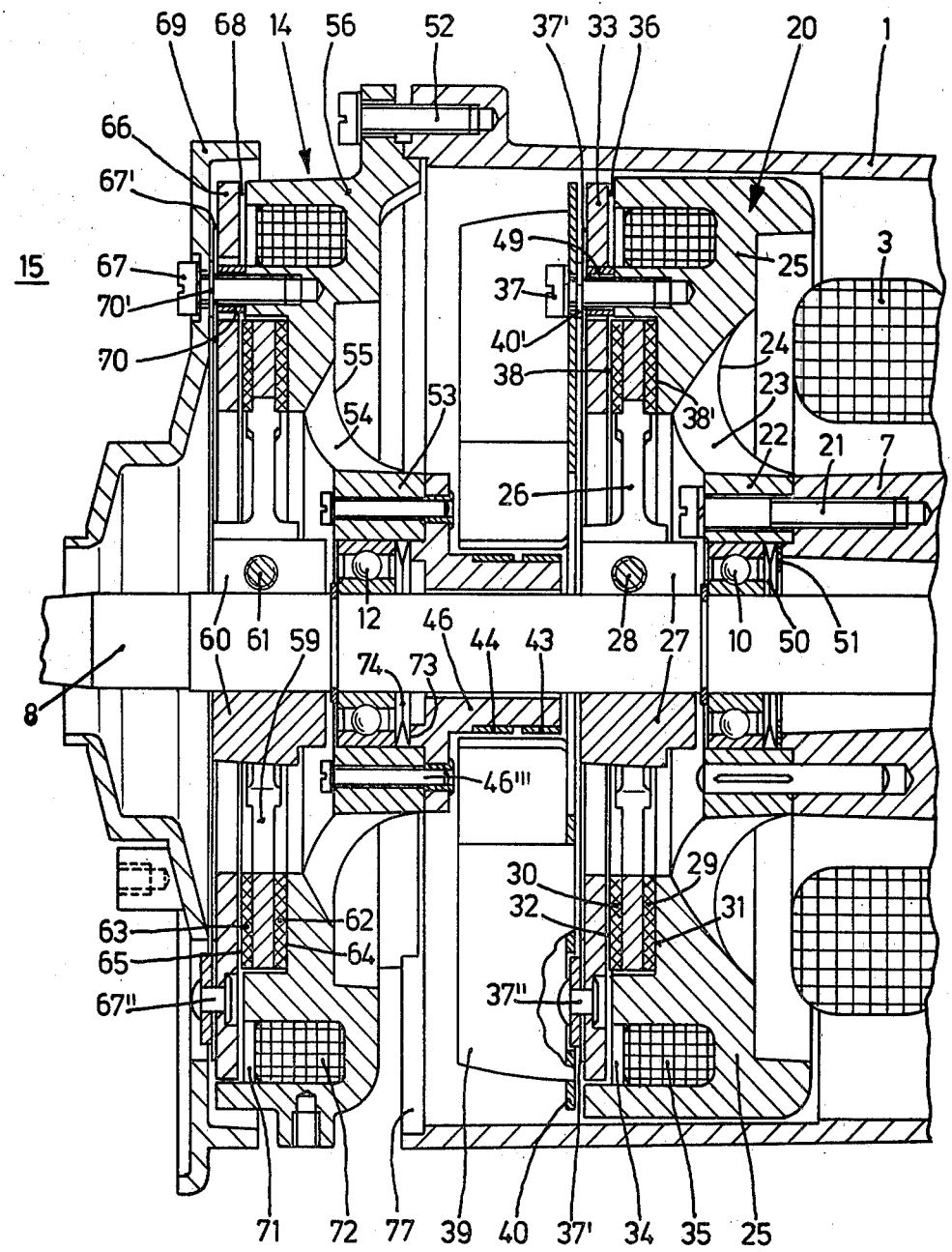
FIG. 1a is an enlarged, partial cross-section of the drive shown in FIG. 1.
Figure 2:
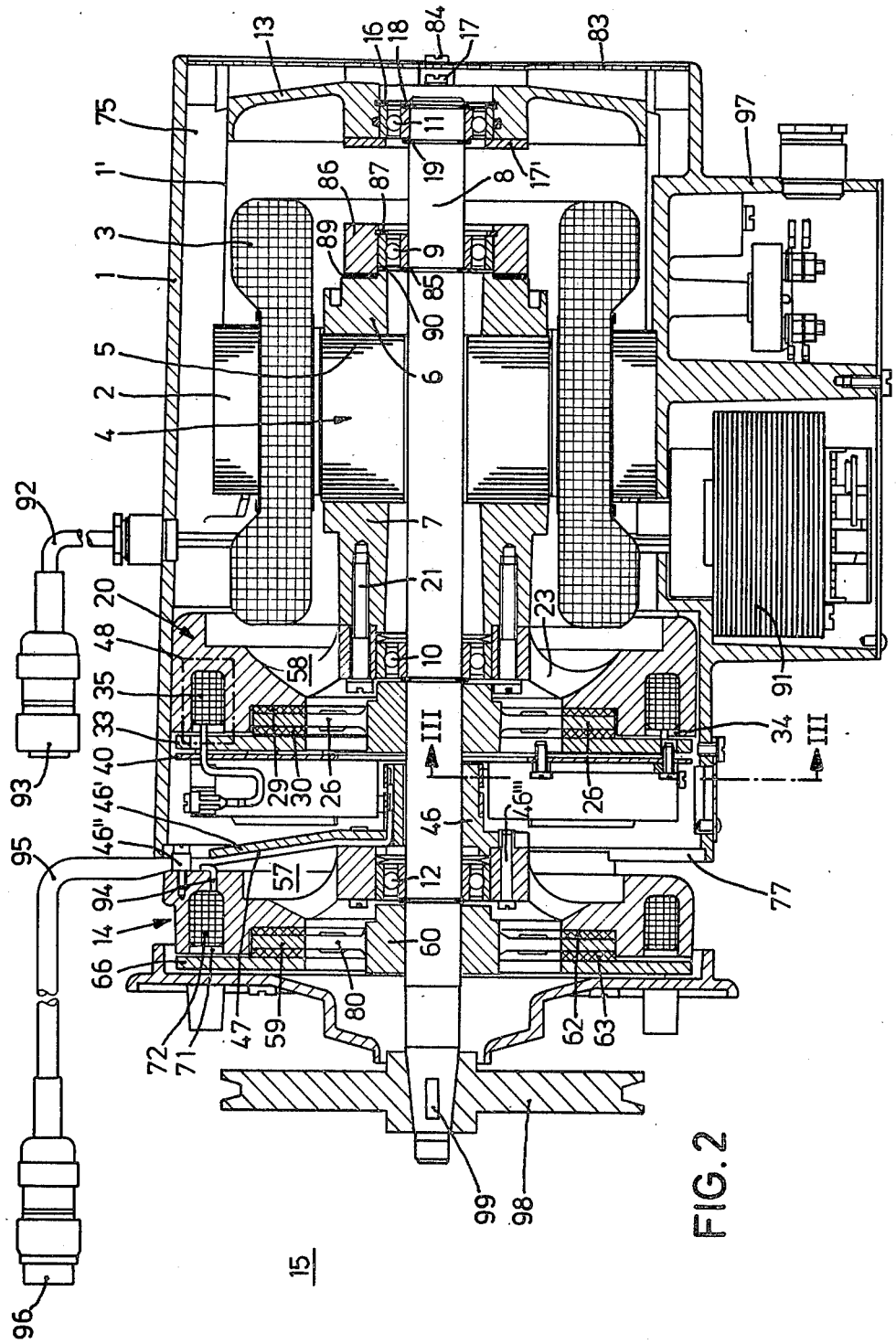
FIG. 2 is a horizontal lengthwise section through the drive and motor shown in FIG. 1.

As illustrated in the drawing figures, a stator, formed of stator plates 2 and stator windings 3, is nonmovably disposed in an approximately cylindrical motor housing 1 of a squirrel-cage motor in such manner that it is heat-shrunk on ribs 1'. A stack of laminations 5 of a rotor 4 being axially tensioned between two elongated short-circuiting rings 6 and 7. An integral through shaft 8 is disposed concentrically and inside the rotor 4, and the rotor 4 is rotatably supported against the shaft 8 by ball bearings 9 and 10. The shaft 8 is slightly displaceably axially mounted in the motor housing 1 by ball bearings 11 and 12 in bearing plates 13 and 14. The bearing plate 13, opposite drive side 15, is designed to be integral with the housing 1, as shown in FIGS. 1 and 2. The ball bearing 11 is mounted axially relative to the bearing plate 13 by a Seeger circlip ring 16 and a bearing plate 17' fastened to the bearing plate by screws 17, and relative to the shaft 8 of Seeger circlip rings 18 and 19. The ball bearing 11 has an axial play of several tenths of a millimeter, so that the shaft 8 is axially displaceable by this amount. Since the shaft 8, as will be described further herinbelow, rotates only intermittently, slide bearings can also be used instead of the ball bearings 11 and 12.

A disk flywheel 20 is disposed on the side of the rotor 4 which faces the drive side 15 and against the short-circuiting ring 7 of the rotor 4, the disk flywheel 20 including an inside ring 22 screwed by screws 21 to the short-circuiting ring 7, spoke-shaped webs 24 projecting radially from the inside ring 22, and an outside ring 25 which constitutes the flywheel mass proper and which is mounted on the webs 24. Openings 23 are provided between the webs 24. The flywheel disk 20 is made integral and consists of ferromagnetic material, cast iron as a rule. The ball bearing 10 is radially supported against the inside ring 22. A clutch disk 26 is nonrotatably and axially nondisplaceably mounted on the shaft 8 inside the outside ring 25 of the disk flywheel 20 by a force fit. In addition, its hub 27 is radially slotted and tightened against the shaft 8 by means of a screw 28. Clutch linings 29 and 30, made of frictional material, are mounted on both sides in the vicinity of the outer circumference of the clutch disk 26, with which a frictional surface 31 on the outside ring 25 of the disk flywheel 20 and a frictional surface 32 of a magnetic armature disk 33 are associated, leaving a small air gap.

The outside ring 25 of the disk flywheel 20 is provided with a recess 34 which is open toward the drive side 15, with a clutch winding 35 disposed in this recess, i.e., the outside ring 25 of the disk flywheel 20 serves simultaneously as a clutch magnet housing. The magnetic armature disk 33 is axially displaceable on three screws 37, uniformly distributed around the circumference, from the end surface of the outside ring 25 which faces the drive side 15, leaving an air gap 36. In addition, a thin membrane-like spring washer 37' is provided, this washer being fastened to the magnetic armature disk 33 by means of three rivets 37" disposed between the screws 37, and whose distance from the outside ring 25 is determined by a spacing bushing 49 surrounding the screws 37.

The air gap 36 is several tenths of a millimeter larger than the total of the two air gaps 38 and 38' between the clutch linings 29 and 30 and the frictional surfaces 31 and 32. A fanwheel 40, provided with fan blades 39, is axially nondisplaceably fastened to the outside ring 25 of the disk flywheel 20 by the screws 37 in such manner that the fanwheel 40 is supported above spacers 40' against the spring washer 37' and consequently against the spacing bushings 49. Two carbon brushes 42 are mounted on the fanwheel 40, these brushes being disposed radially opposite one another and pushed radially inward toward one another by means of pressure springs 41, the brushes resting against slip rings 43 and 44. The slip rings 43 and 44 are mounted on a bushing 46 surrounding the shaft 8. The bushing 46 is provided with a tongue 46' projecting approximately radially, this tongue being attached to the bearing plate 14 by screws 46" and 46"', thereby being attached nonrotatably. The power to the clutch winding 35 is supplied via a pair of conductors 47 guided over the tongue 46', as well as the slip rings 43 and 44, and the carbon brushes 42. When the clutch winding 35 is excited, the magnetic armature disk 33, responding to a magnetic field 48 shown by dot-dash lines, moves against the spacing bushings 49 surrounding the screws 37, deforming the spring washer 37' against the outside ring 25 of the disk flywheel 20, whereby the frictional surface 32 of the magnetic armature disk 33 comes to rest against the corresponding clutch lining 30. At the same time, the rotor 4, because of the stiffness of the clutch disk 26, moves toward the latter, so that its frictional surface 31 comes to rest against the corresponding clutch lining 29. This is made possible by the fact that the ball bearing 9 is mounted with sufficiently great lengthwise play on the short-circuiting ring 6, and by the fact that the ball bearing 10 is disposed axially displaceably in the inside ring 22 of the disk flywheel 20. The outside ring of the ball bearing 10 is supported axially by spring elements 50, for example cup springs, against a corresponding bearing surface 51 on the short-circuiting ring 7 of the rotor 4, so that when the clutch winding 35 is excited, the rotor 4 is again pushed back into its resting position. The magnetic armature disk 33 is then pulled back by the spring washer 37' into its resting position.

The bearing plate 14 is designed as a brake bearing plate. It is connected to a flange of the motor housing 1 by screws 52. It includes an inside ring 53, in which the ball bearing 12, supporting the shaft 8, is radially supported, of radial webs 55 with openings 54 located therebetween, and an outside ring 56 which serves as a brake magnetic housing. It is integral in design and consists of ferromagnetic material, cast iron as a rule. As shown in FIGS. 1 and 2, the design of a brake unit 57 is based on the same principle as the design of a clutch unit 58. A brake disk 59 is disposed inside the outside ring 56, radially slotted hub 60 of this brake disk being non-rotatably and axially nondisplaceably mounted on the shaft 8. In the outside area, a brake disk 59 is provided with two brake linings 62 and 63, associated with a frictional surface 64 on the brake bearing plate 14 and a frictional surface 65 on a brake armature disk 66. The brake armature disk 66 is nonrotatably but axially displaceably mounted on the bearing plate 14 by three screws 67 uniformly distributed around its circumference, leaving an air gap 68. Once again, a thin, membrane-like spring washer 67' is provided, this spring washer being fastened to the brake armature disk 66 by three rivets 67'' disposed between the screws 67; the distance of the spring washer 67' from the outside ring 66 is determined by spacing bushing 70 the surrounding screws 67. The screws 67 are also provided with a cover 69 which is held at a distance relative to the bearing plate 14 by the spacing bushings 70 and spacers 70'.

A recess 71, which is open toward the brake armature disk 66, is provided in the outside ring 56, and a brake winding 72 is disposed in this recess. When the brake winding 72 is energized, the brake armature disk 66 moves toward the 72 is energized, the brake armature disk 66 moves toward the spacing bushings 70 and toward bearing the plate 14, deforming the spring washer 67', and presses its frictional surface 65 aginast the corresponding brake lining 63 of the brake disk 59. The pressure of the brake lining 62 against corresponding frictional surface 64 of the bearing plate 14 is brought about by the fact that the brake disk 59 is displaced along with the shaft 8, i.e., rightward as illustrated in FIGS. 1 and 2. This is made possible by the fact that the outside ring of the ball bearing 12 is disposed with a clost fit in the inside ring 53 of the bearing plate 14, and is supported against a bearing surface 73 on the inside ring 53 by spring elements 74, for example, cup springs once again. When the shaft 8 is displaced in such manner, there is no contact between the clutch lining 29 and corresponding frictional surface 31 of the disk flywheel 20, since the latter together with the rotor 4 participates in the axial displacement. The slight displacement of the shaft 8 by several tenths of a millimeter relative to the bearing plate 13 is made possible by the corresponding axial play of the bearing 11.

Cooling is effected by the fact that air is drawn in from outside by the rotation of the fan blades 39, through cooling air channels 75 provided in the motor housing 1 between the ribs 1'. The air flows radially outward over the stator, through the openings 23 in the disk flywheel 20, through openings 76 in the clutch disk 26, past the clutch unit 58, and radially outward, and leaves the motor housing 1 through openings 77 in the vicinity of the bearing plate 14 in an approximately axial direction. This air flow is represented by a dot-dash line 78 in FIG. 1. At the same time, an additional air flow, represented by dot-dash line 81 in FIG. 1 is drawn in by the fan blades 39 through several openings 79 disposed at equal circumferential distances in the cover 69, openings 80 in the brake disk 59, and the openings 54 in the bearing plate 14. This air flow, as shown in FIG. 1, passes over the brake armature plate 66, the brake disk 59, and the outside ring 56 and leaving the motor housing 1 through the openings 77. By selecting the size of the openings 79, the air volume ratio for clutch and brake can be modified. This is important because a heavy load on the motor causes a considerable stress on the clutch and a correspondingly low stress on the brake, and because the motor and clutch are cooled by the one air stream 78 and the brake is cooled by the other air stream 81.

By virtue of the fact that the fan blades 39 are produced from the fanwheel 40 by stamping and bending, the size of the openings 82 in the fanwheel 40 corresponding to the size of the fan blades, through which additional cooling air is compressed and forced over the magnetic armature disk 33 and the clutch disk 26, whereby a further improvement of cooling is achieved.

The fact that the fanwheel 40 is disposed in the vicinity of the clutch and not in the vicinity of the bearing plate 13, where cooling air 78 enters, ensures that there is less fouling of the clutch, something which is particularly important in the preferred application of the drive according to the invention in sewing machines in the sewing industry. The reason for this is that the pressure drop and consequently the air velocity is maximum at the fanwheel 40. An additional protection against the penetration of dirt is provided by a screen 83 disposed at the end of the motor housing 1, this screen being fastened to the bearing plate 13 by screws 84.

The inside ring of the bearing 9 is axially fastened to the shaft 8 by a Seeger circlip ring 85 in one direction and is axially fastened in the other direction with its outside ring in a holding ring 86 by a Seeger circlip 87. The holding ring 86 is attached to the elongated short-circuiting ring 6 by screws 88, leaving a small space 89. A thin annular disk 90 is disposed between the outside ring of the bearing 9 and the short-circuiting ring 6.

In addition, it should be mentioned that a shown at the bottom in FIG. 1, the outside ring 25 of the disk flywheel 20 and the outside ring 56 of the bearing plate 14 radially overlap the magnetic armature disk 33 and the brake armature disk 66, respectively, so that the air gap between this outside ring and the armature disk 33 can be made still smaller at this point.

The control of clutching and braking action is accomplished in the manner described in German Pat. No. 1,291,014, whereby the control unit required for this purpose is located in a control box, not shown here. The power supply for this control unit is supplied from the supply line via a transformer 91, mounted on the motor housing 1, and thence via a power cord 92 provided with a plug 93. The conductors 47 and conductors 94 for the power supply to the brake winding 72 and the clutch winding 35 are connected to form a cable 95 having a connecting plug 96, this plug serving for connection to the above-mentioned control box.

The power for the stator winding 3 and the transformer 91 is supplied from the line in the usual fashion via a terminal box 97 made integral with the housing 1.

On the drive side end of the shaft 8, a disk pulley 98 is non-rotatably mounted by a feather 99.

The drive described operates as follows:

The motor housing 1, including the bearing plates 13 and 14 and the stator made up of the plates 2 and the windings 3 are permanently fixed, and consequently never rotate. The rotor 4 and the disk flywheel 20 connected therewith, as well as the fanwheel 40, rotate constantly during operation. When the clutch winding 35 is energized, the unit composed of the shaft 8, the clutch disk 26, and the brake disk 59 is coupled to the constantly rotating unit. On the other hand, when the brake winding 72 is energized, this intermittently rotating unit is coupled with the bearing plate 14 and therefore with the stationary part, and is therefore stopped.

If the clutch and brake disks 26 and 59 are axially slightly elastically deformable, which can be accomplished for example by making them of hard-elastic plastic, neither the shaft 8 nor the rotor 4 with the disk flywheel 20 need be made axially slightly displaceable in the manner described.

The same effect is achieved if the webs 24 and/or 55 in the vicinity of the corresponding outside rings 25 and/or 26 are cut through to form a narrow circumferential gap, of approximately one millimeter, and if the webs are connected to the corresponding outside ring via a riveted steel leaf spring. A critical feature for all variants, therefore, is that the outside ring 25 and/or 56 be axially movable by several tenths of a millimeter.

It will be obvious to those skilled in the art that that various changes may be made without departing from the scope of the invention and the invention is not to be considered limited to what is shown in the drawings and described in the specification.

What is claimed is:

1. In an electrical motor control and variable speed drive which includes a motor housing, a constantly driven rotor nonrotatably connected to a disk flywheel which forms a portion of a rotating unit and an intermittently driven shaft, and nonrotatably supporting a clutch disk and a brake disk, means securing a central portion of each said disk to said shaft, the clutch disk being coupled with a frictional surface on a magnetic armature disk which is axially displaceable and is mounted on the flywheel disk, when a given clutch winding is energized, the brake disk being coupled with a frictional surface of an axially displaceable brake armature disk disposed in the motor housing, when a given brake winding disposed in a stationary brake bearing plate forming a portion of a stationary unit is energized, the improvement wherein said clutch winding is disposed in said disk flywheel for rotation with said disk flywheel; said clutch and said brake disk each have two flat side surfaces and are each provided on both of said flat side surfaces with respective frictional linings; said clutch disk is disposed between said magnetic armature disk and one of said frictional surfaces on said disk flywheel; and said brake disk is disposed between said brake armature disk and one of said frictional surfaces on said brake bearing plate; whereby when the clutch winding is energized the clutch disk, the brake disk and the intermittently driven shaft are directly coupled to the rotating unit which includes said disk flywheel, and when said brake winding is energized, the clutch disk, the brake disk and the intermittently driven shaft are directly coupled to the stationary unit which includes the bearing plate.

2. An improved motor control and variable speed drive according to claim 1, wherein said disk flywheel together with said rotor is axially displaceably mounted on said shaft relative to said clutch disk, and further including a spring element positioned between said shaft and said rotor.

3. An improved motor control and variable speed drive according to claim 1, wherein said disk flywheel and said brake bearing plate are mounted side by side on one side of said rotor and further including a fanwheel connected with said rotor, said fanwheel being mounted on said disk flywheel between said disk flywheel and said brake bearing plate.

4. An improved motor control and variable speed drive according to claim 3, wherein apertures for air flows sucked in by said fanwheel are provided in said flywheel disk, said brake bearing plate, said clutch plate and said brake disk for allowing passage of air sucked in by said fanwheel.

5. An improved motor and variable speed drive according to claim 1, wherein said clutch disk and said brake disk are slightly elastically axially deformable.

6. An improved motor control and variable speed drive according to claim 1, wherein said brake disk and said shaft are axially displaceable toward said brake bearing plate, and further including a spring element positioned between said motor housing and said shaft.

7. In an electrical motor control and variable speed drive which includes a motor housing, a constantly driven rotor nonrotatably connected to a disk flywheel and an intermittently driven shaft, and nonrotatably supporting a clutch disk and a brake disk, the clutch disk being coupled with a frictional surface on a magnetic armature disk which is axially displaceable and is mounted on the flywheel disk, when a given clutch winding is energized, the brake disk being coupled with a frictional surface of an axially displaceable brake armature disk disposed in the motor housing, when a given brake winding disposed in a brake bearing plate is energized, the improvement wherein said clutch winding is disposed in said disk flywheel for rotation with said disk flywheel; said clutch disk and said brake disk are provided on both sides of each with respective frictional linings, said clutch disk being disposed between said magnetic armature disk and one of said frictional surfaces on said disk flywheel, said brake disk being disposed between said brake armature disk and one of said frictional surfaces on said brake bearing plate, wherein said brake disk and said shaft are axially displaceable toward said brake bearing plate, and further including a spring element positioned between said motor housing and said shaft.

8. In an electrical motor control and variable speed drive which includes a motor housing, a constantly driven rotor nonrotatably connected to a disk flywheel and an intermittently driven shaft, and nonrotatably supporting a clutch disk and a brake disk, the clutch disk being coupled with a frictional surface on a magnetic armature disk which is axially displaceable and is mounted on the flywheel disk, when a given clutch winding is energized, the brake disk being coupled with a frictional surface of an axially displaceable brake armature disk disposed in the motor housing, when a given brake winding disposed in a brake bearing plate is energized, the improvement wherein said clutch winding is disposed in said disk flywheel for rotation with said disk flywheel; said clutch disk and said brake disk are provided on both sides of each with respective frictional linings, said clutch disk being disposed between said magnetic armature disk and one of said frictional surfaces on said disk flywheel, and said brake disk being disposed between said brake armature disk and one of said frictional surfaces on said brake bearing plate.

wherein said disk flywheel and said brake bearing plate are mounted side by side on one side of said rotor and further including a fanwheel connected with said rotor, said fanwheel being mounted on said disk flywheel between said disk flywheel and said brake bearing plate, and wherein apertures for air flows sucked in by said fanwheel are provided in said flywheel disk, said brake bearing plate, said clutch plate and said brake disk for allowing passage of air sucked in by said fanwheel.

* * * * *